United States Patent [19]

Engstrom

[11] Patent Number: 5,344,629
[45] Date of Patent: Sep. 6, 1994

[54] REDUCING $N_2O$ EMISSIONS

[75] Inventor: Folke Engstrom, Kotka, Finland

[73] Assignee: A. Ahlstrom Corporation, Noormarkku, Finland

[1] Appl. No.: 921,210

[ ] Filed: Jul. 29, 1992

Related U.S. Application Data

[63] Continuation-in-part of Ser. No. 808,461, Jan. 3, 1992.

[51] Int. Cl.⁵ .............................................. C01B 21/00
[52] U.S. Cl. .................................................. 423/239.1
[58] Field of Search ............................ 423/239, 239 A

[56] References Cited

U.S. PATENT DOCUMENTS

| | | | |
|---|---|---|---|
| 4,877,743 | 10/1989 | Waugh et al. | 423/239 |
| 4,915,920 | 4/1990 | Kobayashi et al. | 423/239 |
| 5,133,950 | 7/1992 | Oakes et al. | 423/239 |

*Primary Examiner*—Gary P. Straub
*Attorney, Agent, or Firm*—Nixon & Vanderhye

[57] ABSTRACT

The amount of $N_2O$ in flue gases discharged from a fluidized bed combustion system is minimized by effecting vigorous and intimate mixing of the flue gases (with entrained particles) from a fluidized bed by increasing the velocity of the flue gases and then decreasing the velocity from the increased level, introducing a $N_2O$ decomposing catalyst into the flue gases and particles immediately after increasing and decreasing of the velocity, and mixing the $N_2O$ catalyst with the flue gases and particles, to effect decomposition of the $N_2O$. The catalyst is a calcium based sorbent, such as CaO or limestone, although and other catalysts also may be utilized. Normally the decomposition takes place without increasing the temperature of the flue gases. The increase in velocity is achieved by providing a constriction in the combustor vessel. The interior of the combustor vessel is lined with erosion resistant and thermal insulating material. Where the catalyst is calcium based sorbent, it is calcined, and the calcined particles are removed from the flue gases and recirculated to the fluidized bed, providing at least about 10 to 30% of the calcium based sulfur absorbing sorbent necessary to remove sulfur from the flue gases.

21 Claims, 1 Drawing Sheet

REDUCING $N_2O$ EMISSIONS

CROSS REFERENCE TO RELATED APPLICATIONS

This application is a continuation-in-part of application Ser. No. 07/808,461 filed Jan. 3, 1992.

BACKGROUND AND SUMMARY OF THE INVENTION

The present invention relates to a method for reducing emissions, such as sulfur oxides ($SO_2$), nitrous oxides ($N_2O$) and carbon monoxide (CO), to the atmosphere from the combustion of nitrogen containing combustible compounds. More specifically, this invention relates to a method for reducing such emissions when combusting solid fuels or the like in fluidized bed combustors.

Fluidized bed combustion (FBC) is known to result in efficient combustion, as well as, efficient sulfur oxide and nitrogen oxide emission control. Due to intimate mixing of solid material and gases an efficient combustion is achieved in the fluidized bed already at low combustion temperatures 700°–1000° C. Sulfur oxides ($SO_2$) are captured at this relatively low combustion temperature, which is optimal for $SO_2$ reduction by milled limestone injected with the fuel into the combustion chamber. The relatively low combustion temperature needed in a FBC also results in reduced formation of nitrogen oxides $NO_x$, i.e. $NO_2$ and NO. $NO_x$ emissions from FBC are typically in the range of 100–400 ppm.

The above mentioned improvements in fluidized bed technology over conventional flame combustion are enhanced in circulating fluidized bed combustion (CFBC). Besides providing the possibility of burning different fuels in the same combustor, i.e. both high and low grade fuels, the CFB boiler technology provides better means of controlling the combustion process leading to improved boiler efficiency and improved control of sulfur oxide ($SO_2$) and nitrogen oxide ($NO_x$) emissions. $NO_x$ emissions from CFB boilers are in the range of 50–200 ppm.

Recently attention has been focused on the emission of nitrous oxide ($N_2O$) from combustors. The atmospheric concentration of $N_2O$ increases constantly and it is believed to have an effect on the atmosphere. While the greenhouse effect has mainly been associated with increased $CO_2$ levels in the atmosphere, concern is now growing about strong infrared absorbers, such as $N_2O$, contributing to the greenhouse effect even if the concentration of $N_2O$ is much lower than that of $CO_2$. Further, according to recent research, $N_2O$ may indirectly adversely affect the stratospheric ozone layer as well.

Recent studies indicate that fluidized bed combustion, while achieving significantly lower levels of $NO_x$ emissions compared to flame or pulverized coal combustion, may yield higher levels of $N_2O$. It has been reported that $N_2O$ emissions are generated in higher degree in combustors with low combustion temperatures such as 750°–900° C. At higher temperatures the formation of $N_2O$ does not seem to be a problem, as the formation of $N_2O$ is minor, while the reduction of $N_2O$ to $N_2$ at the same temperature is high.

The likely main mechanism for $N_2O$ formation from fuel nitrogen has been suggested to be the following:

FUEL-N→HCN
HCN+O→NCO
NCO+NO→$N_2O$

At the present time, however, the details of the mechanisms of $N_2O$ formation are not known.

The combustion temperature and the type of fuel seem to be the main factors affecting the $N_2O$ emission. According to tests the emissions decrease significantly when the combustion temperature is increased over 900° C. In the combustion of coal, $N_2O$ emissions varied typically from 30 to 120 ppmv (3% $O_2$, dry), whereas in the combustion of oil shale, peat and wood waste $N_2O$ emissions were typically significantly lower, below 50 ppmv.

There seems to be a strong correlation between temperature and both $NO_x$ and $N_2O$ emissions. Changes to the combustion operating parameters affect $NO_x$ and $N_2O$ emissions inversely. Increasing temperatures result in higher $NO_x$ and lower $N_2O$. Weaker correlations appear to exist for other parameters. A bed temperature increase in the combustion chamber would however result in reduced capability to capture $SO_2$. Staged combustion seems to reduce both $N_2O$ and $NO_x$ emissions to a certain degree, but easily leads to an increase in carbon monoxide (CO) concentration.

One method to reduce the $N_2O$ emissions, suggested in U.S. Pat. No. 5,043,150, is to add hydrogen radicals to the flue gases by providing an additive capable of forming hydrogen radicals at temperatures equal to or higher than those of the flue gases. The hydrogen radicals effectively destroy $N_2O$ through the homogenous gas reaction (A) $N_2O + H \rightarrow N_2 + OH$ Additives providing hydrogen radicals are e.g. methane, liquified petroleum gas, oil, alcohol, pyrolyser gas, or gasifier gas. The hydrogen radical formation is favored at higher temperatures. Apparently by increasing the flue gas temperature the rate of the reaction (A) is also increased and a rapid $N_2O$ destruction may be accomplished.

U.S. Pat. No. 5,048,432, European patent application EP 0 406 185, and German patent application DE 39 33 286 all suggest raising the temperature of flue gases to a level above 900° C. for reducing $N_2O$ emissions.

Other parameters potentially affecting $N_2O$ emissions have also been studied, such as increase of excess air, injection of ammonia, recirculation of fly ash, CO concentration, and addition of limestone. Some studies show slight effects of above mentioned parameters, either decreasing or increasing $N_2O$ emissions, but no clear picture has developed. E.g. $N_2O$ has been found to decompose on the surface of calcined limestone CaO, while simultaneously the NO emissions increase. It has, on the other hand, also been reported that $N_2O$ may result from NO reduction on $CaSO_x$ surfaces, $CaSO_x$ being formed by reduction of $SO_2$ with CaO, the higher the Ca/S ratio the higher the NO reduction on $CaSO_4$. Therefore, until now, no clear conclusion could be drawn on the effect of boiler limestone addition on emissions.

It is, however, known that $N_2O$ emissions from fluidized bed boilers may be on the level of 50–200 ppm, i.e. higher than desired. Therefore, according to this invention a method is provided for reducing the emissions of $N_2O$ from conventional fluidized bed boilers and circulating fluidized bed boilers, atmospheric or pressurized. The method according to the invention also may decompose CO in the flue gases, and improve the $SO_2$ reduction in flue gases from a fluidized bed boiler.

The method of the invention simultaneously reduces $N_2O$, $SO_2$, and CO in flue gases, thereby improving the environmental properties of fluidized bed combustor systems.

In the parent application the $N_2O$ emissions were reduced by providing reactor, typically in the form of a second fluidized bed, removing the particles from the flue gases from the first fluidized bed, and then introducing a $N_2O$ decomposing catalyst into the flue gases without significantly raising the temperature of the flue gases. The catalyst was selected from the group consisting essentially of calcium based sorbents, siderite, ankerite, NiO, CuO, and Mgo.

SUMMARY OF THE INVENTION

The invention differs from that in the parent application by effecting $N_2O$ removal in a more simplified manner. Rather than requiring a separate reactor structure, according to the present invention the $N_2O$ decomposition may take place in the same vessel as the combustion chamber with fluidized bed. As in the parent application, the method is typically practiced under a pressure significantly greater than one atmosphere, and there may be the further step of filtering (under pressure) the flue gases discharged from the particle separated.

According to one aspect of the present invention a method of reducing the emissions of $N_2O$ in flue gases from the combustion of nitrogen containing fuel in a fluidized bed combustor, which has a combustion stage with a fluidized bed of particles, comprises the steps of continuously:

(a) Supplying nitrogen containing fuel and an oxygen containing as for combustion of the fuel into the combustion stage of the combustor to produce flue gases which contain particles.

(b) Maintaining a temperature of about 700°–1000° C. in the combustion stage.

(c) Supplying a Ca-based sulfur absorbing sorbent to the combustor for reducing sulfur emissions in the flue gases.

(d) Without separate removal of the particles from the flue gases affecting vigorous and intimate mixing of the particles and flue gases by increasing the velocity of the flue gases before leaving the combustion stage, and then decreasing the velocity from the increased level.

(e) Introducing an $N_2O$ decomposing catalyst into the flue gases and particles immediately after increasing and decreasing of the velocity thereof. And, (f) mixing the $N_2O$ decomposing catalyst with the flue gases and particles to effect decomposition of the $N_2O$. And, (g) discharging the flue gases with particles and decomposed $N_2O$ therein from the combustor.

The invention preferably comprises the additional step of immediately after step (g) removing particles from the flue gases and recirculating the particles to the fluidized bed of the combustion stage. Also, there is preferably the further step of introducing fly ash into the gases immediately after increasing and decreasing the velocity thereof. Fly ash normally includes considerable amounts of fine catalyst such as lime which can be further used for sulfur capture in the mixing chamber of the combustor in which the mixing step (f) takes place.

Steps (d) through (f) are preferably practiced by passing the flue gases with particles through a constriction in the cross-section of the combustor, which may be formed in the center of the combustor, or at one side wall. These steps are also preferably practiced without significantly raising the temperature of the flue gases. Where the catalyst is a calcium based sorbent, the steps are practiced so that the temperature of the mixing chamber remains relatively high (e.g. greater than 800° C.) in which case step (c) is practiced by recirculating about 10–30% of the calcium based sorbent introduced in step ( c ) and necessary for sulfur capture. Also there preferably is the further step of lining the combustor interior at the constriction with erosion resistant and heat insulating material so as to facilitate maintenance of the temperature of the flue gases after the constriction at about the same level as before the constriction.

Excess of an oxygen containing gas at an air/fuel stoichiometric ratio of $>1$ may preferably be introduced for combustion of the fuel (i.e. oxygen-containing gas may be injected into the combustion chamber in an amount to generate flue gases containing residual oxygen). Ca-based sulfur absorbing absorbent, such as uncalcined limestone, calcined limestone CaO, or Ca-$(OH)_2$, is supplied to the combustion chamber for reducing sulfur emissions in the flue gases. A suspension of flue gases and particles of the fluidized bed are introduced through a constriction section (throttle means) into a mixing chamber arranged in the combustor above the combustion chamber. Fresh Ca-sorbent is supplied with a conveying gas, such as air, into the suspension in the mixing chamber, for catalyzing the decomposition of $N_2O$ in the flue gases and for reducing residual $SO_2$ in the flue gases. A good mixing of Ca-sorbent and flue gases is achieved in the mixing chamber. This facilitates $N_2O$ decomposition, $SO_2$ reduction and CO oxidation, whereafter particles are separated from the flue gases. $CaCo_3$ is calcined at the inlet temperature $>800°$ C., and $Ca(OH)_2$ at $>700°$ C. In the mixing chamber reduction of $N_2O$ takes place when mixing fresh CaO sorbent into the flue gases. CaO surfaces also efficiently catalyze the oxidation of any CO remaining in the flue gases from the combustor.

Besides destruction of $N_2O$, reduction of residual $SO_2$ takes place in the mixing chamber at 700°–1000° C. The mixing chamber may be provided with a highly turbulent bed of fluidized particles, being introduced with the flue gases from the combustion chamber and fresh Ca-based sorbent being supplied with e.g. air to the mixing chamber. The velocity in the mixing chamber may be 3–10 m/s.

When combusting fuel in a circulating fluidized bed combustor, a suspension of flue gases and circulating particles are led from the combustion chamber in the lower part of the combustor through the constriction section into the mixing chamber in the upper part of the combustor and then into a particle separator. The particles separated from the flue gases are recycled into the combustion chamber in the lower part of the combustor for maintaining a circulating bed of particles in the combustor. The flue gases are discharged from the separator.

Ca-sorbent particles introduced into the mixing chamber are also separated in the separator and introduced with the circulating mass of particles into the combustion chamber. Thereby a portion, and under certain conditions all, of the Ca-sorbent needed in the combustor may be first introduced into the mixing chamber and therefrom into the combustion chamber.

According to another aspect of the present invention a method for reducing the emissions of $N_2O$ in flue gases comprises the following steps:
- (a) Supplying nitrogen containing fuel and an oxygen containing gas for combustion of the fuel into the combustion stage of the combustor to produce flue gases which contain particles.
- (b) Maintaining a temperature of about 700°–1000° C. in the combustion stage.
- (c) Supplying a Ca-based sulfur absorbing sorbent to the combustor for reducing sulfur emissions in the flue gases.
- (d) Introducing a Ca-based sorbent $N_2O$ decomposing catalyst to effect decomposition of the $N_2O$ into the flue gases and particles and intimately mixing it with the flue gases, while maintaining temperature high enough to produce calcined sorbent.
- (e) Discharging the flue gases with particles, decomposed $N_2O$, and calcined sorbent there from the combustor; And,
- (f) removing the calcined sorbent from the discharged flue gases and recirculating it to provide part of the sorbent introduced in step (c).

According to still another aspect of the present invention, a method for reducing the emissions of $N_2O$ is practiced comprising the following steps:
- (a) Supplying nitrogen containing fuel and an oxygen containing gas for combustion of the fuel into the combustion stage of the combustor to produce flue gases which contain particles.
- (b) Maintaining a temperature of about 700°–1000° in the combustion stage.
- (c) Supplying a Ca-based sulfur absorbing sorbent entrained in air to the combustor for reducing sulfur emissions in the flue gases.
- (d) Passing the flue gases through a constriction in the combustor.
- (e) Introducing an $N_2O$ decomposing catalyst into the flue gases immediately after they pass through the constriction, to effect mixing of the catalyst with the flue gases and decomposition of the $N_2O$. And,
- (f) discharging the flue gases with decomposed $N_2O$ therein from the combustor.

The invention also comprises a fluidized bed combustor itself. The fluidized bed combustor according to the invention comprises:

An upright vessel having a bottom portion, a top portion, and a central portion, with cross-sectional areas. Means for introducing fuel and oxygen containing gas into the bottom portion of the upright vessel, and for maintaining a fluidized bed therein. Means for discharging flue gases from the top portion of the upright vessel. Means defining a constriction in the cross-sectional area of the vessel between the top and bottom portions thereof through which flue gases flow, the constriction being small enough to significantly increase the velocity of flue gases flowing therethrough. And, means for introducing catalyst into the vessel in the top portion thereof, above the constriction.

The combustor also further comprises erosion resistant and thermal insulating lining material lining the vessel just before, at, and after, the constriction. Preferably the lining material is refractory, which is disposed within substantially the entire top portion of the vessel. The constriction may be at the center of the vessel, being substantially symmetrical about a vertical centerline, or the constriction may be provided by constructing one of the side walls so that it curves in towards the other wall, the other wall being substantially vertical from the bottom portion to the top portion. The cross-sectional area of the vessel at the constriction is typically reduced so that it is about 10 to 90% of that of the bottom portion, preferably about 40 to 60%.

Utilizing the invention, the following advantages are present:
- The construction is simple, with one fluidized bed combustor/reactor only.
- The mixing chamber forms a simple continuation of the combustion chamber.
- The same water tubes (water panels) can be used for forming the combustion chamber and the mixing chamber, whereby water circulation in the steam/water system is easy to arrange.
- The single fluidized bed combustor arrangement does not need as much space as a system having two interconnected fluidized bed systems, both needing separate fluidizing means, particle separators and supports; and
- The total height of the present system and the height needed for the building housing it are lower than in a system including two separate fluidized be systems.

It is the primary object of the present invention to provide for the effective reduction of the amount of $N_2O$ pollution from fluidized bed combustors; and optionally to further reduce $SO_2$ and CO emissions. This and other objects of the invention will become clear from an inspection of the detailed description of the invention, and from the appended claims.

DETAILED DESCRIPTION OF THE DRAWINGS

Figure 1:
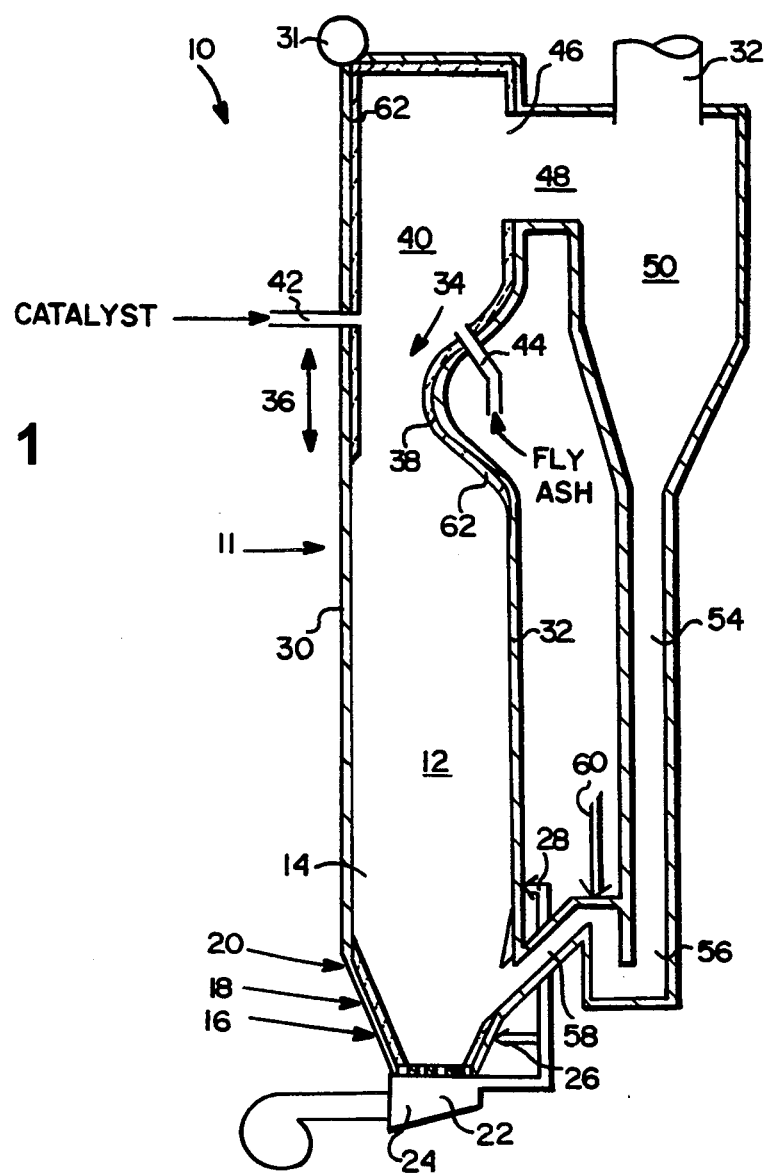
FIG. 1 is a schematic view of a first exemplary embodiment of apparatus according to the present invention, which utilizes a circulating fluidized bed combustor with a constriction section dividing the combustor into a combustion chamber and a mixing chamber.

A preferred embodiment of the present invention is shown schematically in FIG. 1, wherein solid fuel material is combusted in a circulating fluidized bed combustor 10 comprising an upright vessel 11. The combustor 10 includes a combustion chamber (bottom portion) 12 containing a fluidized bed of particles 14 with inlet 16 for fuel, inlet 18 for $CaCO_3$ and inlet 20 for other additives such as recirculated fly ash. Fluidizing air is led into the combustion chamber 12 though a bottom plate 22 from a windbox 24. The air is led into the chamber 12 at a pressure greater than one atmosphere and a rather high flow rate (e.g. about 3–10 m/s, preferably >5 m/s), high enough to fluidize the bed, vigorously mix fuel, sorbent and gases, and entrain a portion of the solid particles. Secondary and tertiary air is introduced through inlets 26 and 8. Air may be introduced at different levels in order to achieve staged combustion and minimal $NO_x$ formation.

The walls 30, 32 in the combustion chamber 12 are formed of water tube panels, and connected to conventional header 31. In the central part of the combustor vessel 11 one side wall 32 projects or is bent inwardly toward the other (opposite) wall 30 as illustrated at 34 to form a constriction section 36. The inward projection 38 of the side wall 32 constitutes a nose or a neck disposed in the flow passage in the upper half (but near the vertical center) of the combustor 10. The cross sectional area of the constriction section 36 of FIG. 1 is about 40% of the cross-sectional area of the combustion chamber 12. The intensity of the constriction 36 may vary from 10–90% of the bottom portion 12, but normally is about 40–60%.

A mixing chamber (top portion) 40 is formed in the combustor above the inward projection 38 of the bent sidewall 32. Flue gases containing residual oxygen and $N_2O$, as well as minor amounts of $SO_2$ and entrained particles, are discharged from the combustion chamber 12 via the constriction section 36 into the mixing chamber 40. The mixing chamber 40 has an inlet 42 for $CaCO_3$ or like $N_2O$ decomposing catalyst, and optionally an inlet 44 for recirculated fly ash. The fluid velocity in chamber 40 typically is about 3–10 m/s.

The constriction 36 promotes vigorous mixing of particles and gases in the mixing chamber 40. The upward streams or stratifications of gases and solid material are mixed in the area of the constriction 36. The flow rate of particles increases in the constriction 36 and decreases immediately beyond or downstream of the constriction. The particles above the constriction 36 tend to fall down,due to the decreased velocity, but the fast gas flow in the constriction passage 34 force the first mentioned particles back into an upward movement. Also those particles beyond the constriction 36 that are adjacent the side walls of the chamber 40 slow down and tend to fall along the side walls of the mixing chamber 40 until they fall into the constriction 36 itself, thereby further promoting a vigorous mixing action just above the constriction 36.

The mixing chamber 40 has an outlet 46 for flue gas and particles entrained in the flue gas. The suspension of flue gas and particles entrained therein i s led through a conduit 48 to a cyclone separator 50. Flue gases are discharged from the cyclone separator through an outlet 52. The particles separated from the flue gas are led through a return pipe 54 via a loop seal 56 and inlet pipe 58 into the bottom part of the combustion chamber 12. Fuel may also be introduced into the system through an inlet 60 in the loop seal.

The tube walls in the constriction section 36 and mixing chamber 40 are covered with an erosion resistant and heat insulating layer 62, such as refractory material, in order to prevent erosion and maintain a rather high temperature in the mixing chamber 40, for facilitating the calcination of fresh $CaCO_3$ introduced therein through inlet 42. Especially the inlet and outlet of the constriction section 36 should be protected with erosion resistant lining 62. The walls 30, 32 in the bottom part of the combustion chamber 12 are also usually covered by a refractory lining.

The $CaCO_3$ or like catalyst is preferably introduced into the mixing chamber 40 via inlet 42 with air as conveying medium, the air also improving the mixing of particles and gases in the mixing chamber 40.

The invention utilizing the FIG. 1 apparatus thus provides a method for substantially improving the reduction of emissions from a circulating fluidized bed or a bubbling bed system. The combustion conditions are controlled to achieve minimal $NO_x$ emissions. $N_2O$ is decomposed at optimal conditions catalyzed by fresh CaO (or the like catalysts, such as limestone or Ca-$(OH)_2$, with a particle size of about 1–1000 microns; or selected from the group consisting essentially of calcium based sorbents, siderite, ankerite, NiO, CuO, and MgO) in the mixing chamber 40. A majority of the $SO_2$, at least 50%, preferably 70 to 90%, in the flue gases is captured in the combustion chamber 12 and substantially all of that remaining in the mixing chamber 40.

Sorbent material $CaCO_3$ may be introduced independently into the combustion chamber 12 and the mixing chamber 40, or the main part of the sorbent may be calcined in the mixing chamber 40 and supplied therefrom into the combustion chamber. At least about 10–30% of total amount of sorbent needed for $SO_2$ capture is preferably introduced into the mixing chamber and at most 70–90% into the combustion chamber.

Figure 2:
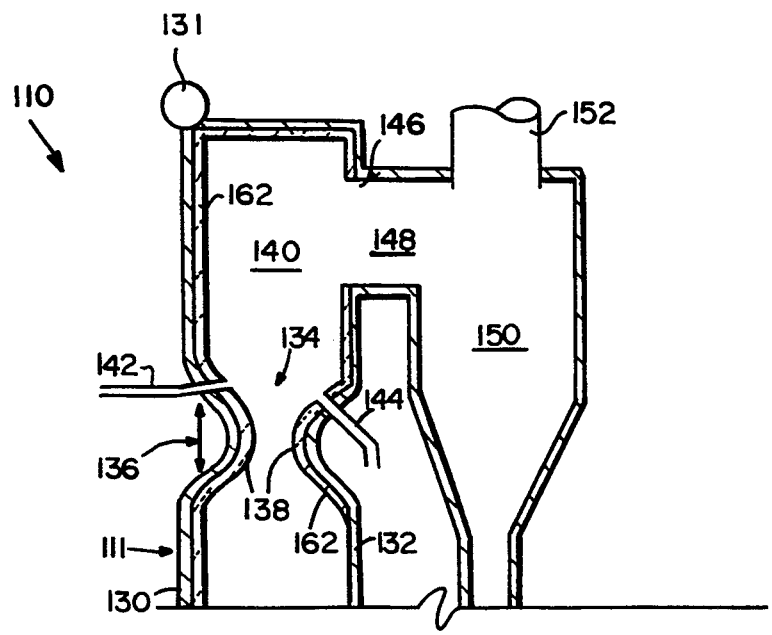
FIG. 2 is a schematic view of another embodiment according to the invention, utilizing a different type of constriction.

In the FIG. 2 embodiment, a combustor 110 having two of its side walls 130 and 132 bent inwardly, and associated apparatus, are illustrated. The same reference numerals as in FIG. 1 are used where appropriate, only preceded by a "1". The bottom portion 112, not shown in FIG. 2, is identical to portion 12 in FIG. 1.

The FIG. 2 embodiment provides a more symmetrical combustor configuration, and constriction 136, also having symmetrical suspension flow close to both side walls 130 and 132. The FIG. 1 embodiment is easier to construct since only one side wall (32) is bent. Otherwise the same benefits, mentioned earlier, can be achieved by embodiments shown in FIGS. 1 and 2.

While the invention has been described in connection with what is presently considered to be the most practical and preferred embodiments, it is to be understood that the invention is not to be limited to the disclosed embodiments, but on the contrary, is intended to cover various modifications and equivalents included within the spirit and scope of the appended claims.

What is claimed is:

1. A method for reducing the emissions of $N_2O$ in flue gases from the combustion of nitrogen containing fuel in a fluidized bed combustor, which has a combustion stage with a fluidized bed of particles, comprising the steps of continuously:
   (a) supplying nitrogen containing fuel and an oxygen containing gas for combustion of the fuel into the fluidized bed of the combustor to produce flue gases which contain particles;
   (b) maintaining a temperature of about 700°–1000° C. in the combustion stage;
   (c) supplying a Ca-based sulfur absorbing sorbent to the fluidized bed for reducing sulfur emissions in the flue gases;
   (d) without separate removal of the particles from the flue gases effecting vigorous and intimate mixing of the particles and flue gases by increasing the velocity of the flue gases before leaving the combustion stage, and then decreasing the velocity from the increased level;
   (e) introducing an $N_2O$ decomposing catalyst into the flue gases and particles immediately after increasing and decreasing of the velocity thereof;
   (f) mixing the $N_2O$ decomposing catalyst with the flue gases and particles to effect decomposition of the $N_2O$; and
   (g) discharging the flue gases with particles and decomposed $N_2O$ therein from the combustor.

2. A method as recited in claim 1 comprising the further step (h), immediately after step (g), of removing particles from the flue gases, and recirculating the particles to the fluidized bed of the combustion stage.

3. A method as recited in claim 2 comprising the further step of introducing fly ash into the flue gases immediately after increasing and decreasing of the velocity thereof.

4. A method as recited in claim 2 wherein steps (d) and (f) are practiced by passing the flue gases with particles through a constriction in the cross-section of the combustor.

5. A method as recited in claim 4 wherein the combustor has side walls, and wherein the constriction in the cross-section of the combustor is formed by only one of the side walls.

6. A method as recited in claim 4 wherein steps constriction in the cross-section of the combustor is axial.

7. A method as recited in claim 4 wherein steps (d)–(g) are practiced without significantly raising the temperature of the flue gases.

8. A method as recited in claim 4 wherein steps (d) and (f) are practiced by passing the gases through a constriction having a cross-sectional area of about 40–60% of the combustion stage.

9. A method as recited in claim 1 wherein the $N_2O$ decomposing catalyst is a Ca-based sorbent which is calcined during the practice of steps (d)–(g); and wherein step (c) is practiced at least in part by recirculating Ca-based sorbent introduced in step (e) and calcined in step (d)–(g) into the fluidized bed combustor.

10. A method as recited in claim 9 wherein at least about 10–30% of the Ca-based sorbent introduced in step (c) and necessary for sulfur capture is introduced in step (e) and recirculated to the fluidized bed.

11. A method as recited in claim 9 comprising the further step of lining the combustor interior at the constriction with erosion resistant and heat insulating material so as to facilitate maintenance of the temperature of the flue gases after the constriction at about the same level as before the constriction, to facilitate calcination of Ca-based sorbent catalyst.

12. A method as recited in claim 1 wherein step (e) is practiced by adding a catalyst selected from the group consisting essentially of calcium based sorbents, siderite, ankerite, NiO, CuO, and Mgo.

13. A method as recited in claim 1 wherein step (e) is practiced by adding a catalyst selected from the group consisting of limestone, $Ca(OH)_2$, and CaO, having a particle size of about 1–1000 microns.

14. A method as recited in claim 1 wherein steps (d) through (g) are practiced so as to provide a velocity, decreased from the increased level, of about 3–10 m/s.

15. A method as recited in claim 1 wherein steps (d)–(g) are practiced without significantly raising the temperature of the flue gases.

16. A method as recited in claim 1 wherein step (e) is practiced by introducing the catalyst entrained in air.

17. A method for reducing the emissions of $N_2O$ in flue gases from the combustion of nitrogen containing fuel in a fluidized bed combustor, which has a combustion stage with a fluidized bed of particles, comprising the steps of continuously:

(a) supplying nitrogen containing fuel and an oxygen containing gas for combustion of the fuel into the fluidized bed of the combustor to produce flue gases which contain particles;

(b) maintaining a temperature of about 700°–1000° C. in the combustion stage;

(c) supplying a Ca-based sulfur absorbing sorbent to the fluidized bed for reducing sulfur emissions in the flue gases;

(d) introducing a Ca-based $N_2O$ decomposing catalyst to effect decomposition of the $N_2O$ into the flue gases and particles after the fluidized bed and intimately mixing it with the flue gases, while maintaining temperature high enough to produce calcined sorbent;

(e) discharging the flue gases with particles, decomposed $N_2O$, and calcined sorbent therein, from the combustor; and (f) removing the calcined sorbent from the discharged flue gases and recirculating it to provide part of the sorbent introduced in step (c).

18. A method as recited in claim 17 wherein steps (c)–(f) are practiced to introduce in step (d) about 10–30% of the sorbent needed to effect sulfur removal from the flue gases.

19. A method for reducing the emissions of $N_2O$ in flue gases from the combustion of nitrogen containing fuel in a fluidized bed combustor, which has a combustion stage with a fluidized bed of particles, comprising the steps of continuously:

(a) supplying nitrogen containing fuel and an oxygen containing gas for combustion of the fuel into the fluidized bed of the combustor to produce flue gases which contain particles;

(b) maintaining a temperature of about 700°–1000° in the combustion stage;

(c) supplying a Ca-based sulfur absorbing sorbent entrained in air to the fluidized bed for reducing sulfur emissions in the flue gases;

(d) passing the flue gases through a constriction in the combustor;

(e) introducing an $N_2O$ decomposing catalyst into the flue gases immediately after they pass through the constriction, to effect mixing of the catalyst with the flue gases and decomposition of the $N_2O$; and (f) discharging the flue gases with decomposed $N_2O$ therein from the combustor.

20. A method as recited in claim 19 wherein the $N_2O$ decomposing catalyst is a Ca-based sorbent which is calcined during the practice of steps (d)–(f); and wherein step (c) is practiced at least in part by recirculating Ca-based sorbent introduced in step (e) and calcined in step (d)–(f) into the fluidized bed combustor.

21. A method as recited in claim 19 wherein step (d) is practiced by passing the gases through a constriction having a cross-sectional area of about 40–60% of the combustion stage.

* * * * *